March 17, 1964 N. E. McFADDEN 3,125,329
APPARATUS FOR PRODUCING GLASS FIBERS
Filed Dec. 10, 1959 2 Sheets-Sheet 1
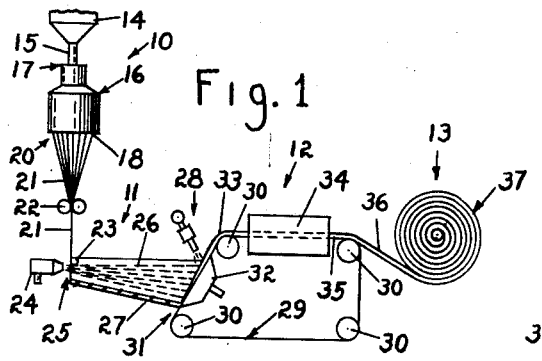
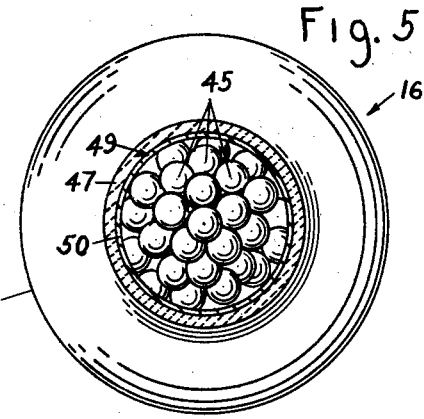
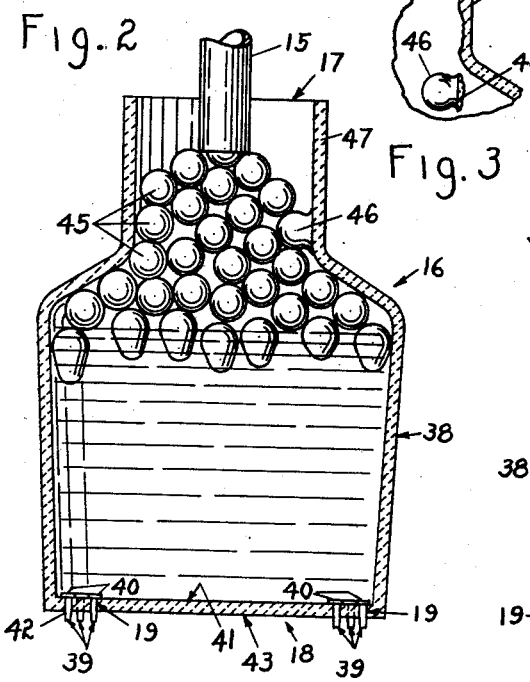
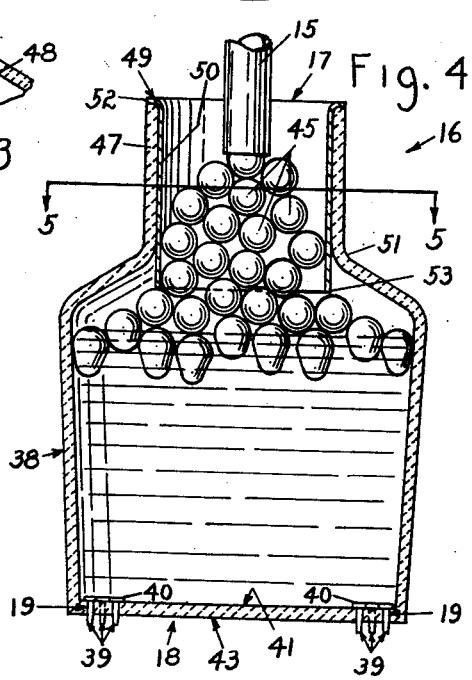
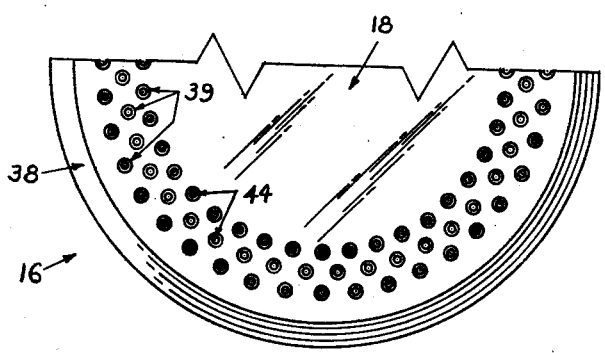
INVENTOR.
Norman E. McFadden
BY
Nobbe & Swope
ATTORNEYS March 17, 1964
N. E. McFADDEN
3,125,329
APPARATUS FOR PRODUCING GLASS FIBERS
Filed Dec. 10, 1959
2 Sheets-Sheet 2
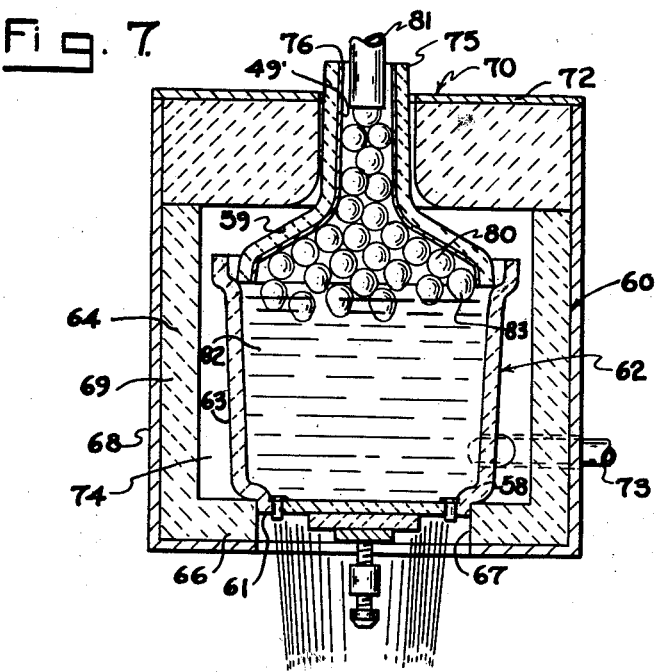
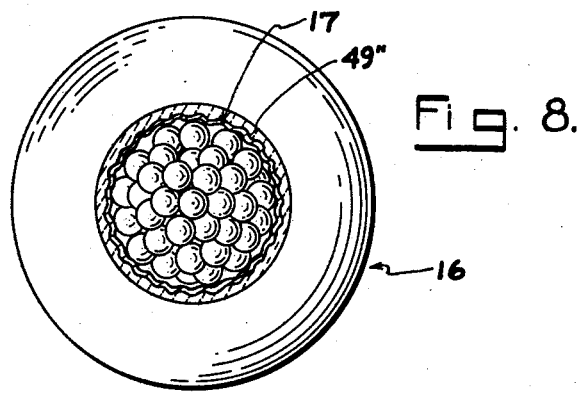
INVENTOR.
NORMAN E. McFADDEN
BY John A. McKinney
ATTORNEY United States Patent Office 3,125,329
Patented Mar. 17, 1964

3,125,329
APPARATUS FOR PRODUCING GLASS FIBERS
Norman E. McFadden, Defiance, Ohio, assignor to Johns-Manville Corporation, New York, N.Y., a corporation of New York
Filed Dec. 10, 1959, Ser. No. 858,820
6 Claims. (Cl. 263—47)

This invention generally relates to a glass melting crucible for producing glass fibers and more particularly relates to an improved glass melting crucible made of refractory clay.

This application is a continuation-in-part of my copending application Serial No. 654,590, filed April 23, 1957, now abandoned.

Glass fibers have customarily been prepared heretofore by employing melting crucibles made of precious metal alloys such as platinum alloys. However, due to the limited supply of platinum and the highly skilled techniques required in fabrication, melting crucibles made therefrom have necessarily been extremely expensive.

More recently melting crucibles have been utilized for glass fiber production which are made of a refractory clay material. These chambers are very economical to produce and provide reasonably good durability with high operating efficiencies, but they have suffered the disadvantages of localized erosion.

One method of producing glass fibers utilizing refractory clay melting crucibles comprises operating the melting crucible approximately one-half to two-thirds filled with molten glass. Above the molten glass the melting crucible is filled with glass materials such as glass marbles. Where the glass is maintained in the molten state the erosion problem is of no consequence. But in the upper part of the crucible where the heat is just sufficient to soften a marble and cause it to adhere to the side wall, a fragment of the side wall may be pulled away when the marble is broken loose. This acute erosive action rather quickly results in failure of the melting crucible.

In heating a charge of glass in a glass melting crucible, it should be appreciated that there are several heat transfer processes. Outside of the melting crucible but within the outer wall defining a heating chamber radiative heat transfer occurs between the walls where the hot products of combustion are introduced and the outside surface of the melting crucible. Conductive heat transfer occurs primarily between the outside and inside surfaces of the melting crucible. Within the melting crucible, radiative heat transfer occurs between the inside surface and the outer periphery of the molten glass mass as well as conductive heat transfer.

The glass particles above the molten mass, because of the interstices between particles, must relay primarily upon radiant heat transfer from the melting crucible wall. It will be readily appreciated that the overall heat transfer rate to the particles is less than that to the molten mass.

In refractory melting crucibles, heretofore employed heated by hot products of combustion, a change in heat distribution could only be obtained by changing the fuel input. The maintenance of a maximum firing rate usually results in overheating the molten mass while a reduced heat input results in decreased production.

Accordingly, it is an object of the present invention to provide a refractory clay crucible for glass melting which resists erosion at the inlet area.

It is a further object of this invention to provide a refractory clay crucible for glass melting wherein the rate of heat transfer at the inlet area is increased.

The present invention provides a refractory clay melting crucible having a metallic liner insert positioned in the inlet area which insert prevents erosion of the refractory.

The metallic liner of the invention also provides means of increasing the heat release to the top of the crucible. The liner is preferably of a material having a coefficient of heat reflection greater than the refractory clay. The heat transfer rate may be further increased by providing the liner with an extended surface, which may be in the form of corrugations, to increase the conduction of heat from the refractory to the liner and subsequent radiation to the glass charge.

Other objects and advantages of the invention will become more apparent during the course of the following description when taken in connection with the accompanying drawings.

In the drawings wherein like numerals are employed to designate like parts throughout the same:

FIG. 1 is a schematic side view of apparatus adapted to produce fibrous mats;

FIG. 2 is a side view in section of a glass melting chamber made of refractory to illustrate the problem solved by the present invention;

FIG. 3 is a fragmentary section view of a portion of the wall of the melting crucible shown in FIG. 2;

FIG. 4 is a side view in section of a refractory melting crucible with a liner made in accordance with the invention;

FIG. 5 is a top plan view of the melting crucible of FIG. 4;

FIG. 6 is a partial bottom plan view of the apparatus of FIGS. 2 and 4;

FIG. 7 is a sectional side elevational view of a two piece refractory melting crucible with a liner made in accordance with the invention, which melting crucible is positioned within a heating chamber to which hot products of combustion are supplied; and FIG. 8 is a plan view of a refractory melting crucible inlet throat with a corrugated liner.

As shown in FIG. 1, apparatus adapted to produce glass fibers employing a refractory melting crucible includes a primary fiber forming section 10, a fine fiber attenuation section 11, a mat forming section 12, and a mat roll-up section 13. The primary fiber forming section 10 includes a hopper 14 adapted to contain a supply of glass materials suitably in the form of glass marbles. The hopper 14 is provided with a vertically disposed conduit 15 through which marbles are adapted to be conveyed to the melting crucible 16.

The melting crucible 16 is suitably made of circular section and has an inlet opening 17 for receiving glass marbles from the conduit 15 of the hopper 14 positioned thereabove. The melting crucible 16 is also provided in its base 18 with a plurality of apertures 19, FIG. 6, through which molten glass formed within the melting crucible 16 is adapted to be exuded downwardly as a plurality of small molten streams 20. The molten streams 20 solidify into primary fibers 21 of small diameter. Then they are directed between a pair of rubber covered pull rolls 22, rotated at constant speed, to attenuate the molten streams 20 and form them into the primary fibers of selected diameter.

From the pull rolls 22 the primary fibers 21 are directed downwardly to the fine fiber attenuation section 11 where they pass behind a guide block 23 and are maintained in parallel aligned relation thereby by means of a plurality of parallel slots provided on the rear face thereof. An internal combustion burner 24, adapted to produce a monodirectional blast 25 of gas of high velocity and intense heat, is positioned adjacent and slightly beneath the guide block 23 to direct its gaseous blast beneath the guide block and against the primary fibers 21 as they move downwardly past the guide block. The burner blast 25 is effective to melt and attenuate the primary fibers 21 into a plurality of extremely fine fibers 26 of very short length and small diameter of the order of microns. The fine fiber attenuation section 11 includes a horizontally disposed fiber directing chute 27 into which the fine fibers 26 produced by the blast 25 from burner 24 are received and thereby directed to the mat forming section 12 in a monodirectional flow stream. A suitable binder material is applied to the fine fibers 26 as they pass through the chute 27 by means of a spray nozzle 28 positioned thereabove.

The mat forming section 12 includes foraminous conveyor 29 of continuous length, supported upon a plurality of four rotatable rolls 30. One of the rolls is adapted to be power driven for moving the conveyor 29 at a selected speed. The fiber collecting and mat forming flight 31 of the conveyor 29 is positioned in fiber-receiving relation adjacent the exhaust end of the fiber directing chute 27. A suction box 32 is positioned behind the mat forming flight 31 and is connected to a pressure reducing apparatus such as a fan, and is effective to reduce atmospheric pressure adjacent the mat forming flight and attract the fine fibers 26. The foraminous conveyor 29 is adapted to stop the fibers 26 and separate them from their entraining gases which pass therethrough and are exhausted. The result is that a mat 33 of gradually increasing thickness is collected on the forming flight 31 of the conveyor 29.

An oven 34 is positioned in surrounding relation to the upper flight 35 of the foraminous conveyor 29 to heat the mat 33 and binder and thereby set or cure the binder and bond the fibers 26 together in fixed relation. The cured mat 36 is withdrawn from the conveyor 29 after it emerges from the oven 34 and thence passes to the mat roll-up section 13. There the mat 36 is rolled into a suitable package 37 for subsequent handling and shipment.

The problem which the apparatus of the present invention overcomes is illustrated by FIGS. 2 and 3. As previously mentioned the melting crucible 16 includes a circular base 18, and a side wall 38 of circular horizontal section. The side wall 38 is of generally uniform diameter for about ½ of its height then tapers inwardly for about ¼ of its height to a cylindrical inlet opening 17 of uniform diameter comprising about the upper ¼ of the side wall 38.

The base 18 of the melting crucible 16 is provided with a plurality of small apertures 19 arranged in concentric array. These apertures may be fitted with tubular alloy inserts 39 fabricated of temperature-resistant metal. These inserts are provided with enlarged heads 40 which fit against the inner surface 41 of the base 18 of the melting crucible 16. The body portions 42 of the inserts 39 are of greater length than the thickness of the base 18 of the melting crucible 16. Thus the inserts 39 protrude a short distance below the base 18 to prevent flooding of molten glass across the outer surface 43 thereof. Each of the inserts 39 is provided with a small bore 44, FIG. 6, through which molten glass, formed within the melting crucible 16, is adapted to be exuded as a small molten stream 20, FIG. 1.

As will be seen from FIG. 2, the melting crucible 16 is operated about ½ full of molten glass with the upper half filled with marbles 45 in various stages of softening to a molten state. As shown by the reference numeral 46, it often happens that a marble lying adjacent the wall 47 of the inlet opening 17 softens sufficiently to adhere to such wall, within the inlet opening. As shown in FIG. 3, the adhered softened marble 46 will ultimately break away from the side wall 47 and will carry with it a small amount of the refractory 48 of the side wall. When this happens a sufficient number of times the wall 47 will be eroded away and the melting crucible 16 will be rendered inoperative.

To overcome this erosion problem a liner 49 for the inlet opening 17 of the melting crucible 16 is provided as illustrated in FIGS. 5, 7 and 8. The liner 49 may comprise a cylindrical sleeve element 50, as specifically shown in FIG. 4, adapted to fit within the inlet opening 17 and extends into the interior of the melting crucible 16 a short distance beyond the lower terminus 51 of the inlet opening. Marbles 45 are thereby prevented from adhering to the side wall 47 and the erosion problem is thereby avoided.

The outside diameter of the cylindrical sleeve element 50 of the liner 49 is slightly smaller than the inside diameter of the wall 47 of the inlet opening 17 and is provided at its upper end with an outwardly flaring shoulder 52 which enables it to be positioned in selected relation in the inlet opening 17. The outwardly flaring shoulder 52 rests against the top of the inlet opening 17 and is thus effective to provide the selected positioning of the liner 49.

As further shown in FIG. 4 the lower terminal edge 53 of the liner 49 extends a short distance below the lower terminus 51 of the inlet opening 17. Thus the incoming marbles 45 are kept out of contact with the inner surface of the inlet opening 17 and are thus prevented from bonding thereto.

Materials from which the liner of the invention can be made include high temperature resistant metals and those which have good heat absorption and heat reflection properties. Such metals include alloys of platinum including platinum-rhodium alloys and stainless steel. The latter has been preferably employed due to its more advantageous cost and availability. One particular stainless steel alloy which can be used is so-called Inconel (trademark), which comprises 77% nickel, 15% chromium and 7% iron with the remaining 1% comprising small amounts of other elements.

In FIG. 7 a melting crucible, made in accordance with the present invention, is illustrated in an environmental apparatus for use in producing glass fibers. A refractory casing 60 is positioned in surrounding relation to the melting crucible 62. The casing 60 includes a cylindrical wall 64 and a base 66 formed integrally therewith. In the base 66, there is provided a circular opening 67. A steel shell 68 is formed in surrounding relation to the refractory 69 and is adapted to support the same. The casing 60 also includes a top 70 adapted to span the diameter of the cylindrical wall 65. A circular opening 71 is formed centrally of the top 70. The top 70, like the remainder of the refractory casing 60, also includes a steel shell element 72.

A conduit 73 is inserted through the side wall 64 of the refractory casing 60 and the steel shell 68, through which a gaseous fuel is admitted into the casing 60 for combustion therein.

It will be understood, however, that combustion may take place externally of the casing 60, and then the heated products of combustion discharged therein.

The melting crucible 62 is positioned within the refractory casing 60 with its base 61 in alignment with the opening 67 of the base 66 of the casing. The base 61 of the melting crucible 62 is slightly larger than the opening 67 and thus is supported on the base 66 of the casing 60. The refractory casing 60 is of larger diameter than the melting crucible 62 to provide a combustion or heating chamber 74 wherein gases introduced by the conduit 73 may be burned for heating the melting crucible 62 and glass materials placed therein. The inlet 75 of the melting crucible 62 extends through the opening 71 of the top 70 of the casing 24, which opening is of slightly larger diameter than the inlet to permit the exhaust of combustion gases from the heating or combustion chamber 74.

Located in gravity feed relation above the inlet throat 75 of the melting crucible 62 there is a positioned a hopper, not shown, which is connected to feed tube 81 positioned above the inlet 13. Marbles 80 from within the hopper pass by gravity downwardly through the feed tube 81 to the inlet opening 76 of the melting crucible 62.

Operation of the apparatus includes filling the melting crucible 62 with marbles 80 and establishing combustion in the combustion chamber 74. The heat of combustion is transmitted primarily by conduction through the wall 63 of the melting crucible 62 and melts the marbles 80 to form a body of molten glass 82. The level of the molten glass stabilizes at about the lower terminus 83 of the inlet throat 75. Marbles 80 in various stages of melting are sustained in floating relation on top of the molten glass 82. As molten glass is withdrawn from the melting crucible additional marbles from the hopper are automatically admitted to the melting crucibles.

As illustrated in FIG. 7, the melting crucible is comprised of bottom and top sections 58 and 59, respectively. Top section 59 is in the form of an inverted funnel and has a liner 49' which conforms to the interior thereof. A large area of contact is thus established to which heat may be conducted from the refractory portion of section 59 for subsequent radiation to marbles 80.

Heat transfer by radiation to the work charge is intensified by the use of heat reflective liners and consequently the heat absorptivity of the refractory in contact with the liners is increased. The conduction of heat from the refractory to the liners may be further enhanced by increasing the area of contact. One manner in which the area of contact may be increased is illustrated in FIG. 8 wherein the liner 49'' is corrugated.

The use of a heat reflective liner within the inlet throat to increase heat release at the crucible top also results in better utilization of fuel, where hot products of combustion are employed to heat the melting crucible, since most of the available heat will have been absorbed by the crucible side wall before the products are exhausted.

The improvements provided by the present structure are believed to be obvious from the foregoing discussion. Thus a glass melting chamber made of refractory material is provided which has greatly improved durability.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A refractory crucible for melting glass marbles of a predetermined diameter comprising: a base portion defining a plurality of apertures for withdrawing molten glass, said base portion having a diameter adapted to be greater than the said predetermined diameter of said marbles; a lower side wall portion extending generally upright from said base; an upper side wall portion defining an inlet opening having a diameter adapted to be greater than said predetermined diameter of said marbles but less than the diameter of said lower wall portion; an intermediate wall portion forming a transitional zone between said lower and upper wall portions; and a metallic liner having an outside diameter substantially equal to the inside diameter of said upper side wall portion and extending at least into said transitional zone, said liner having its lower terminal portion in spaced relationship with the side walls of said crucible.

2. The refractory crucible as described in claim 1 wherein said lower side wall portion is substantially equal to one half the overall height of said crucible, said upper side wall portion is substantially equal to one quarter the overall height of said crucible, said intermediate wall portion is substantially equal to one quarter the overall height of said crucible, and the length of said metallic liner is greater than one quarter the overall height of said crucible.

3. In combination, a refractory clay crucible adapted to melt glass particles of a preselected maximum diameter prior to exudation into glass filaments, said crucible also being adapted to position in the upper portion thereof a stack of said glass particles in staggered relation with each other, said crucible having a base portion defining a plurality of orifices through which molten glass is exuded, said base portion having a diameter adapted to be greater than said preselected maximum diameter of said particles, said crucible also having a refractory clay lower side wall portion extending generally upright from said base, and a refractory clay upper side wall portion defining a restricted throat having a diameter adapted to be greater than said preselected maximum diameter of said particles but less than the diameter of said lower side wall portion; a metallic liner having an outside diameter substantially equal to the inside diameter of said restricted throat and being positioned contiguous to said restricted throat and preventing adherence of semi-molten particles thereto; and gravity feeding means gravitationally replenishing said particles as they descend in said stack.

4. The combination as described in claim 3, wherein said restricted throat is defined by a removable lid.

5. The crucible as described in claim 3, wherein the internal surface of said liner is corrugated and exposed to the interior of said crucible to provide an extended heat radiating surface.

6. The crucible as described in claim 3, wherein said liner is comprised of metal having a higher heat reflectivity than the refractory of said crucible.

References Cited in the file of this patent

UNITED STATES PATENTS

| | | |
|---|---|---|
| 2,031,083 | Weller | Feb. 18, 1936 |
| 2,190,296 | Richardson | Feb. 13, 1940 |
| 2,201,684 | Kingsbury | May 21, 1940 |
| 2,255,578 | Baker | Sept. 9, 1941 |
| 2,276,295 | Ferguson | Mar. 17, 1942 |
| 2,495,956 | Cook | Jan. 31, 1950 |
| 2,814,657 | Labino | Nov. 26, 1957 |